(12) United States Patent
Murata et al.

(10) Patent No.: US 10,028,335 B2
(45) Date of Patent: Jul. 17, 2018

(54) COMMUNICATION SYSTEM, COMMUNICATION APPARATUS, AND COMMUNICATION METHOD, CAPABLE OF CIRCULATING DATA

(71) Applicant: KYOCERA Document Solutions Inc., Osaka-shi, Osaka (JP)

(72) Inventors: Shuji Murata, Osaka (JP); Yoichi Hiranuma, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/690,634

(22) Filed: Aug. 30, 2017

(65) Prior Publication Data

US 2018/0063885 A1   Mar. 1, 2018

(30) Foreign Application Priority Data

Aug. 31, 2016   (JP) ................. 2016-168926

(51) Int. Cl.
*H04W 4/00* (2018.01)
*H04W 88/10* (2009.01)
(Continued)

(52) U.S. Cl.
CPC ............. *H04W 88/10* (2013.01); *H04W 4/02* (2013.01); *H04W 12/06* (2013.01); *H04W 84/12* (2013.01); *H04W 88/12* (2013.01)

(58) Field of Classification Search
CPC ....... H04W 88/10; H04W 4/02; H04W 12/06; H04W 84/12; H04W 88/12; H04W 4/80;
(Continued)

(56) References Cited

U.S. PATENT DOCUMENTS

2009/0054077 A1* 2/2009 Gauthier ................. G06F 3/014
                                                                    455/456.1
2011/0081923 A1* 4/2011 Forutanpour ........... H04W 4/21
                                                                    455/457
(Continued)

FOREIGN PATENT DOCUMENTS

JP           09223086 A     8/1997

*Primary Examiner* — Yong Hang Jiang
(74) *Attorney, Agent, or Firm* — Alleman Hall Creasman & Tuttle LLP

(57) ABSTRACT

A communication system includes a plurality of communication apparatuses. The communication apparatuses each include a display portion, an operation detection portion, a determination processing portion, and a transmission processing portion. The operation detection portion detects an operation on the display portion. When a specific operation of moving an operation position on the display portion is detected by the operation detection portion, the determination processing portion determines whether or not another one of the communication apparatuses exists at an azimuth corresponding to a movement direction of the operation position in the specific operation. When the determination processing portion determines that another one of the communication apparatuses exists at the azimuth corresponding to the movement direction, the transmission processing portion transmits circulation data and a transmission destination list of the circulation data to the other communication apparatus that exists at the azimuth corresponding to the movement direction.

8 Claims, 6 Drawing Sheets

(51) Int. Cl.
*H04W 84/12* (2009.01)
*H04W 88/12* (2009.01)
*H04W 4/02* (2018.01)
*H04W 12/06* (2009.01)

(58) Field of Classification Search
CPC ..... H04W 12/08; H04W 4/008; H04W 4/046; H04W 12/04; H04W 76/10; H04W 12/02; H04W 84/18; H04W 48/04; H04W 84/005; H04W 4/027; H04W 4/21
USPC ........................................................ 340/3.71
See application file for complete search history.

(56) References Cited

U.S. PATENT DOCUMENTS

| | | | | |
|---|---|---|---|---|
| 2014/0281955 | A1* | 9/2014 | Sprenger | G06F 3/016 |
| | | | | 715/702 |
| 2015/0039692 | A1* | 2/2015 | Goncalves | H04L 51/20 |
| | | | | 709/204 |
| 2015/0271312 | A1* | 9/2015 | Want | H04M 1/7253 |
| | | | | 455/420 |

* cited by examiner

COMMUNICATION SYSTEM, COMMUNICATION APPARATUS, AND COMMUNICATION METHOD, CAPABLE OF CIRCULATING DATA

INCORPORATION BY REFERENCE

This application is based upon and claims the benefit of priority from the corresponding Japanese Patent Application No. 2016-168926 filed on Aug. 31, 2016, the entire contents of which are incorporated herein by reference.

BACKGROUND

The present disclosure relates to a communication system including a plurality of communication apparatuses, a communication apparatus, and a communication method executed by a communication system.

In an office of a company, or the like, data may be circulated among a plurality of users. For example, there is known a communication system in which, in accordance with a transmission destination list generated in advance, data (hereinafter, referred to as "circulation data") to be circulated among a plurality of users can be sequentially transmitted among a plurality of communication apparatuses corresponding to the plurality of users.

SUMMARY

A communication system according to one aspect of the present disclosure includes a plurality of communication apparatuses. The communication apparatuses each include a display portion, an operation detection portion, a determination processing portion, and a transmission processing portion. The operation detection portion is configured to detect an operation on the display portion. The determination processing portion is configured to, when a specific operation of moving an operation position on the display portion is detected by the operation detection portion, determine whether or not another one of the communication apparatuses exists at an azimuth corresponding to a movement direction of the operation position in the specific operation. The transmission processing portion is configured to, when the determination processing portion determines that another one of the communication apparatuses exists at the azimuth corresponding to the movement direction, transmit circulation data and a transmission destination list of the circulation data to the other communication apparatus that exists at the azimuth corresponding to the movement direction.

A communication apparatus according to another aspect of the present disclosure includes the display portion, the operation detection portion, the determination processing portion, and the transmission processing portion.

The communication method according to another aspect of the present disclosure is executed by a communication system including a plurality of communication apparatuses each including a display portion and an operation detection portion configured to detect an operation on the display portion. The communication method includes a first step and a second step shown below. In the first step, when a specific operation of moving an operation position on the display portion is detected by the operation detection portion, it is determined whether or not the communication apparatus exists at an azimuth corresponding to a movement direction of the operation position in the specific operation. In the second step, when it is determined in the first step that the communication apparatus exists at the azimuth corresponding to the movement direction, circulation data and a transmission destination list of the circulation data are transmitted to the communication apparatus that exists at the azimuth corresponding to the movement direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for understanding of the present disclosure. It is noted that the following embodiments are merely examples embodying the present disclosure, and are not intended to limit the technical scope of the present disclosure.

[Communication System 100]

Figure 1:
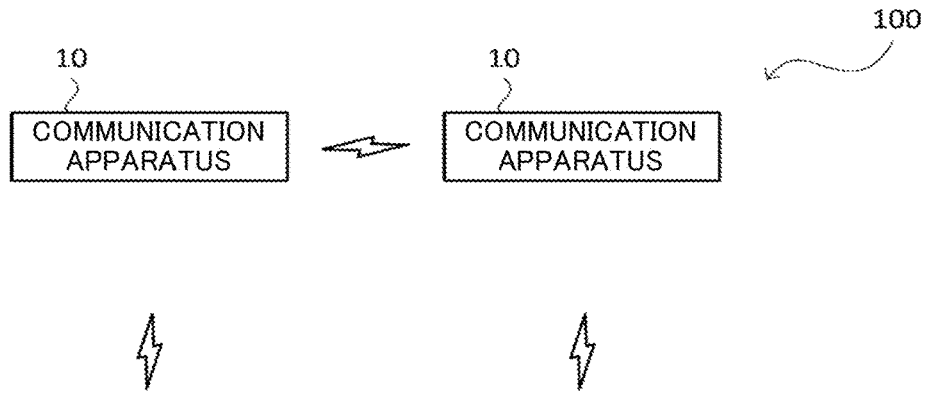
FIG. 1 is a diagram showing the configuration of a communication system according to an embodiment of the present disclosure.

As shown in FIG. 1, a communication system 100 according to an embodiment of the present disclosure includes a plurality of communication apparatuses 10. In the communication system 100, data communication is executed wirelessly among the communication apparatuses 10. Specifically, in the communication system 100, in accordance with a transmission destination list generated in advance, data (hereinafter, referred to as "circulation data") to be circulated among a plurality of users are sequentially transmitted among the plurality of communication apparatuses 10 corresponding to the plurality of users. Examples of the circulation data include document data, video data, and audio data.

[Communication Apparatus 10]

Figure 2:
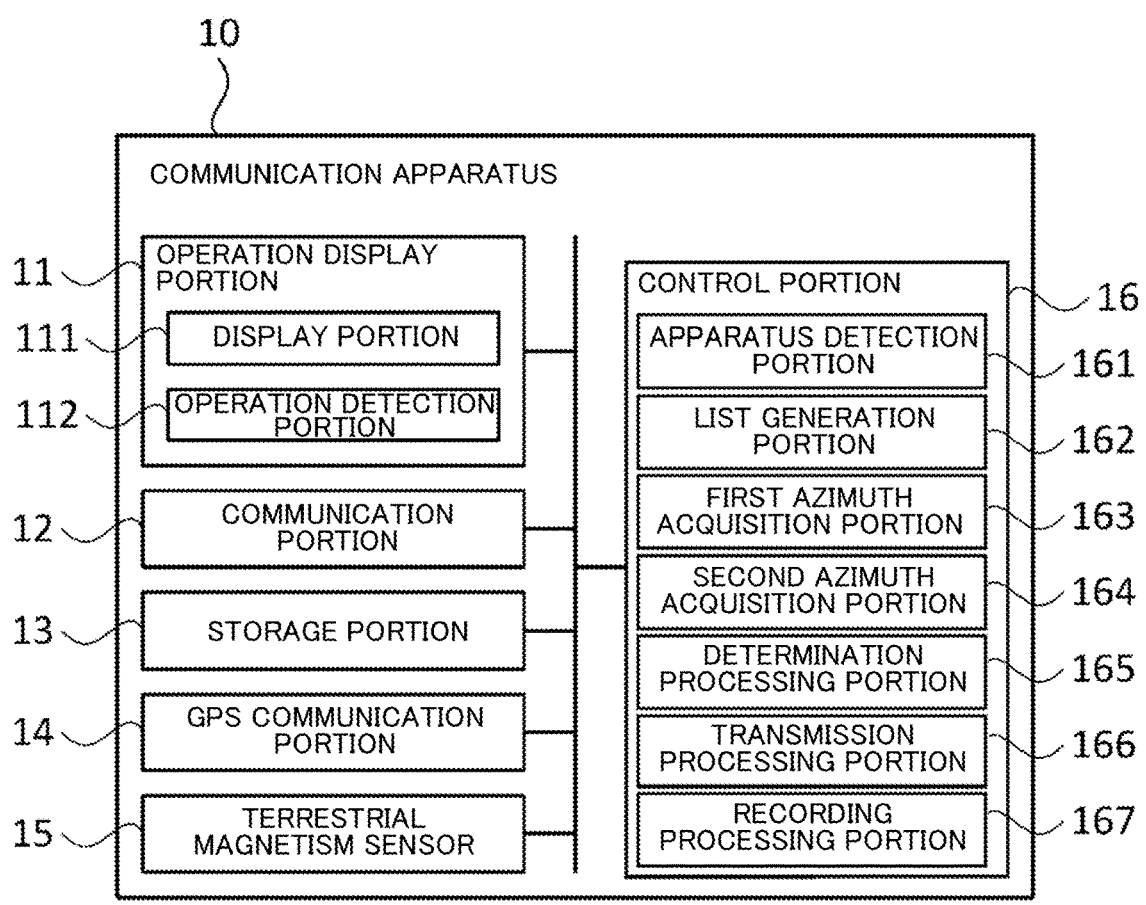
FIG. 2 is a block diagram showing the configuration of a communication apparatus included in the communication system according to the embodiment of the present disclosure.

The communication apparatus 10 is a mobile communication terminal such as a smartphone or a tablet terminal carried by a user. Specifically, as shown in FIG. 2, the communication apparatus 10 includes an operation display portion 11, a communication portion 12, a storage portion 13, a GPS communication portion 14, a terrestrial magnetism sensor 15, and a control portion 16. It is noted that the communication apparatus 10 may be a mobile phone, a PDA, a notebook computer, a personal computer, or the like.

Figure 3:
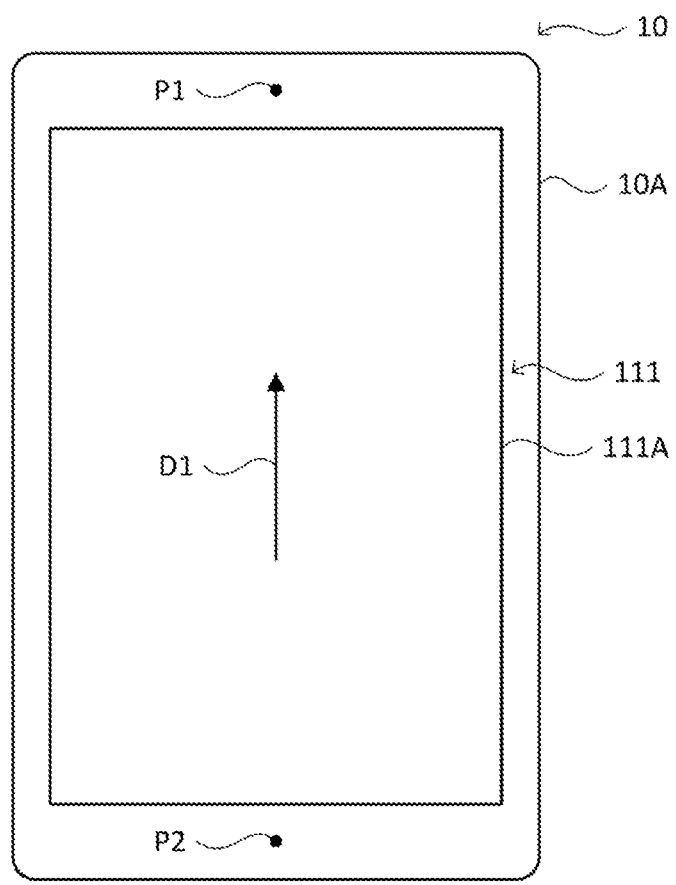
FIG. 3 is a view showing the exterior configuration of the communication apparatus included in the communication system according to the embodiment of the present disclosure.

The operation display portion 11 is a user interface of the communication apparatus 10. As shown in FIG. 2 and FIG. 3, the operation display portion 11 includes a display portion 111 and an operation detection portion 112.

The display portion 111 displays various information in accordance with a control command from the control portion 16. For example, the display portion 111 is a liquid crystal display. As shown in FIG. 3, the display portion 111 has a display surface 111A on which a screen is displayed. As shown in FIG. 3, the outer periphery of the display surface 111A is surrounded by a body frame 10A of the communication apparatus 10.

The operation detection portion 112 is a so-called touch panel capable of detecting user's operation on the display portion 111. For example, when a user's finger contacts with the display surface 111A, the operation detection portion 112 detects the contact position on the display surface 111A at which the user's finger contacts therewith, by a capacitive method. It is noted that the operation detection portion 112 may detect contact on the display surface 111A with a user's finger, by another detection method such as a resistive film method. The operation detection portion 112 may detect a user's operation on the display portion 111 when the distance between a user's finger and the display surface 111A becomes smaller than a predetermined reference distance.

The communication portion 12 is a communication interface capable of executing data communication wirelessly with an external communication apparatus such as another communication apparatus 10. For example, the communication portion 12 executes data communication wirelessly with an external communication apparatus, in accordance with a predetermined communication protocol prescribed by Bluetooth. For example, the communication portion 12 is capable of executing wireless communication by Bluetooth with an external communication apparatus that exists within a range of about 10 m from the communication apparatus 10, with a radio wave intensity (2.5 mW) called class 2. It is noted that the communication portion 12 may execute wireless communication with an external communication apparatus, in accordance with a communication standard of a wireless LAN.

Here, the communication apparatus 10 has executed, in advance, pairing which is an authentication procedure for a communication partner in Bluetooth communication, with another communication apparatus 10. In the pairing, pairing IDs which are needed for authenticating communication partners are exchanged between apparatuses to perform Bluetooth communication. The pairing ID of another communication apparatus 10 acquired by the communication apparatus 10 through the pairing is stored in the storage portion 13. Thus, it becomes possible to thereafter perform wireless communication by Bluetooth between the communication apparatus 10 and the other communication apparatus 10.

The storage portion 13 is a nonvolatile storage device such as a flash memory, and allows data to be read and written by the control portion 16. The storage portion 13 stores the pairing IDs of other communication apparatuses 10. In addition, the storage portion 13 stores data such as document data, video data, and audio data. In the communication system 100, data stored in the storage portion 13 of each communication apparatus 10 can be provided to be circulated among users of the communication apparatuses 10.

The GPS communication portion 14 is capable of receiving a radio wave transmitted from a GPS satellite.

The terrestrial magnetism sensor 15 is a three-axis sensor capable of detecting terrestrial magnetism on each of three axes perpendicular to each other.

The control portion 16 includes control devices such as a CPU, a ROM, a RAM, and an EEPROM, which are not shown. The CPU is a processor which executes various calculation processes. The ROM is a nonvolatile storage device in which information such as a control program for causing the CPU to execute various processes is stored in advance. The RAM is a volatile storage device, and the EEPROM is a nonvolatile storage device. The RAM and the EEPROM are used as temporary storage memories (working areas) for various processes executed by the CPU. The control portion 16 executes various control programs stored in advance in the ROM, by the CPU. Thus, the communication apparatus 10 is comprehensively controlled by the control portion 16. It is noted that the control portion 16 may be configured from an electronic circuit such as an integrated circuit (ASIC), or may be a control portion provided separately from a main control portion that comprehensively controls the communication apparatus 10.

In the case where the circulation data is to be circulated among a plurality of users, if a user determines the next transmission destination by referring to the transmission destination list displayed on the display portion 111 of the communication apparatus 10, a communication apparatus 10 corresponding to an absent user might be determined as the next transmission destination. If the circulation data is transmitted to the communication apparatus 10 corresponding to an absent user, circulation of the circulation data among the plurality of users is stagnated.

On the other hand, in the communication system 100 according to the embodiment of the present disclosure, stagnation of circulation of the circulation data among a plurality of users can be avoided as described below.

Specifically, the storage portion 13 stores, in advance, a circulation data transmission/reception program for causing the CPU of the control portion 16 to execute a circulation list generation process (see flowchart in FIG. 4) and a circulation data transmission/reception process (see flowchart in FIG. 5) described later. It is noted that the circulation data transmission/reception program may be stored in a non-transitory computer-readable storage medium such as a CD, a DVD, or a flash memory, and may be installed on the storage portion 13 by being read from the storage medium. In addition, the circulation data transmission/reception program may be acquired from an external information processing apparatus and may be installed on the storage portion 13.

As shown in FIG. 2, the control portion 16 includes an apparatus detection portion 161, a list generation portion 162, a first azimuth acquisition portion 163, a second azimuth acquisition portion 164, a determination processing portion 165, a transmission processing portion 166, and a recording processing portion 167. Specifically, the control portion 16 executes the circulation data transmission/reception program stored in the storage portion 13, using the CPU. Thus, the control portion 16 functions as the apparatus detection portion 161, the list generation portion 162, the first azimuth acquisition portion 163, the second azimuth acquisition portion 164, the determination processing portion 165, the transmission processing portion 166, and the recording processing portion 167.

The apparatus detection portion 161 detects another communication apparatus 10 that exists within a predetermined range.

For example, the apparatus detection portion 161 controls the communication portion 12 to transmit a control signal according to a communication method of Bluetooth, to the surrounding area around the communication apparatus 10, thereby detecting apparatuses that can perform Bluetooth communication within the communication range of Bluetooth. Then, on the basis of the pairing IDs acquired from the detected apparatuses and the pairing IDs of other communication apparatuses 10 stored in the storage portion 13, the apparatus detection portion 161 detects other communication apparatuses 10 from the detected apparatuses. Here, the communication range of Bluetooth communication executed by the communication portion 12 is an example of a predetermined range in the present disclosure.

The apparatus detection portion 161 may control the communication portion 12 to transmit a control signal according to a communication method of a wireless LAN, to the surrounding area around the communication apparatus 10, thereby detecting apparatuses that can perform wireless LAN communication within the communication range of the wireless LAN. In this case, on the basis of MAC addresses acquired from the detected apparatuses and MAC addresses of other communication apparatuses 10 stored in the storage portion 13, the apparatus detection portion 161 detects other communication apparatuses 10 from the detected apparatuses. Here, the communication range of the wireless LAN communication executed by the communication portion 12 is an example of a predetermined range in the present disclosure.

The list generation portion 162 generates the transmission destination list for the circulation data, including all or some of the other communication apparatuses 10 detected by the apparatus detection portion 161.

For example, the list generation portion 162 generates the transmission destination list including, among the other communication apparatuses 10 detected by the apparatus detection portion 161, other communication apparatuses 10 that belong to the same preset group as the self-apparatus. For example, the group is a division or the like to which the user of the communication apparatus 10 belongs.

For example, in the communication system 100, the storage portion 13 of each communication apparatus 10 stores group information indicating the group to which the user of the communication apparatus 10 belongs. For example, the list generation portion 162 acquires the group information from each of the other communication apparatuses 10 detected by the apparatus detection portion 161. Then, on the basis of the acquired group information, the list generation portion 162 generates the transmission destination list including the self-apparatus and other communication apparatuses 10 that belong to the same group as the self-apparatus.

The list generation portion 162 may generate the transmission destination list including all the other communication apparatuses 10 detected by the apparatus detection portion 161. The list generation portion 162 may generate the transmission destination list including other communication apparatuses 10 selected in accordance with user's operation on the operation display portion 11, among the other communication apparatuses 10 detected by the apparatus detection portion 161. For example, the list generation portion 162 may generate the transmission destination list including other communication apparatuses 10 designated by the specific operation described later.

The first azimuth acquisition portion 163 acquires the azimuth of each of the other communication apparatuses 10 detected by the apparatus detection portion 161. Here, the first azimuth acquisition portion 163 is an example of an azimuth acquisition portion in the present disclosure.

For example, the first azimuth acquisition portion 163 acquires position information indicating the position of the self-apparatus on the earth, on the basis of information included in radio waves transmitted from a plurality of GPS satellites and received by the GPS communication portion 14. In addition, the first azimuth acquisition portion 163 acquires, from the other communication apparatuses 10 detected by the apparatus detection portion 161, the position information of each of the other communication apparatuses 10. Then, the first azimuth acquisition portion 163 acquires an azimuth of each of the other communication apparatuses 10 on the basis of the position information of the self-apparatus and the position information of each of the other communication apparatuses 10.

The second azimuth acquisition portion 164 acquires the direction of the self-apparatus.

For example, the second azimuth acquisition portion 164 acquires a specific azimuth at which a reference position P1 of the body frame 10A shown in FIG. 3 is directed, on the basis of terrestrial magnetism on each of three axes detected by the terrestrial magnetism sensor 15, and the inclination of the communication apparatus 10 detected by an inclination sensor (not shown). Here, the specific azimuth is an azimuth indicated by a specific direction D1 extending from a reference position P2 toward the reference position P1 as shown in FIG. 3. It is noted that, even when the orientation of the self-apparatus is inclined relative to the horizontal plane, the communication apparatus 10 can acquire the specific azimuth by using a terrestrial magnetism sensor of three-axis type.

When a specific operation of moving an operation position on the display portion 111 is detected by the operation detection portion 112, the determination processing portion 165 determines whether or not another communication apparatus 10 exists at an azimuth corresponding to a movement direction of the operation position in the specific operation. For example, the specific operation is a so-called swipe operation or flick operation in which a user's finger slides on the display surface 111A while contacting with the display surface 111A. In this case, the operation position is a contact position on the display surface 111A at which the user's finger contacts therewith.

For example, the determination processing portion 165 determines whether or not another communication apparatus 10 exists at an azimuth corresponding to the movement direction, on the basis of azimuths of the other communication apparatuses 10 acquired by the first azimuth acquisition portion 163.

Specifically, the determination processing portion 165 determines whether or not the specific operation is performed, on the basis of a result of detection about whether or not the user's finger contacts with the display surface 111A and detection of the contact position thereof by the operation detection portion 112. When the specific operation is performed, the determination processing portion 165 acquires an azimuth corresponding to the movement direction on the basis of the specific azimuth acquired by the second azimuth acquisition portion 164. Then, the determination processing portion 165 determines whether or not another communication apparatus 10 exists at the acquired azimuth corresponding to the movement direction, on the basis of the azimuths of the other communication apparatuses 10 acquired by the first azimuth acquisition portion 163.

When the determination processing portion 165 determines that another communication apparatus 10 exists at the azimuth corresponding to the movement direction, the transmission processing portion 166 transmits the circulation data and the transmission destination list to the other communication apparatus 10 existing at the azimuth corresponding to the movement direction.

For example, when the other communication apparatus 10 that exists at the azimuth corresponding to the movement direction is included in the transmission destination list, the transmission processing portion 166 transmits the circulation data and the transmission destination list thereto.

The recording processing portion 167 records, in the transmission destination list, reception of the circulation data by the self-apparatus, when a predetermined recording condition is satisfied. For example, the recording condition is that a predetermined recording operation is performed on the operation display portion 11, that the specific operation is detected, or that the circulation data and the transmission destination list are received from another communication apparatus 10.

[Circulation List Generation Process]

Figure 4:
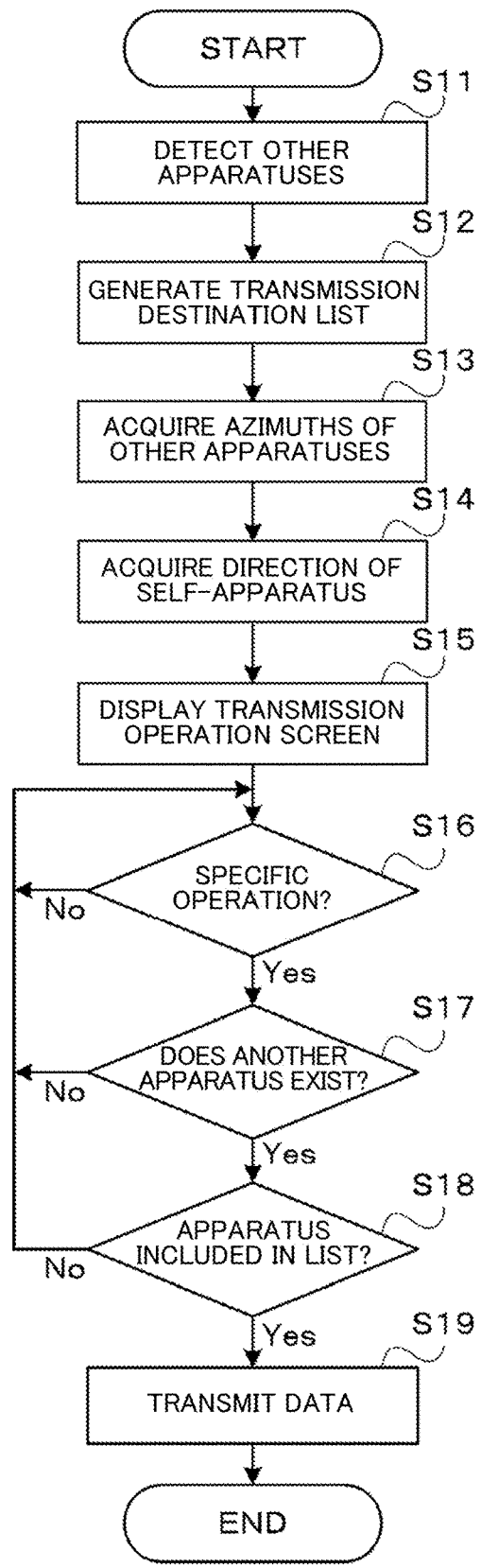
FIG. 4 is a flowchart showing an example of a circulation list generation process executed by the communication apparatus included in the communication system according to the embodiment of the present disclosure.

Hereinafter, with reference to FIG. 4, an example of the procedure of a communication method of the present disclosure will be described together with an example of the procedure of the circulation list generation process executed by the control portion 16 in the communication apparatus 10. Here, steps S11, S12, ..., denote numbers of the procedure (steps) in the process executed by the control portion 16. It is noted that the control portion 16 executes the circulation list generation process, when a command for executing the circulation list generation process in which any of data stored in the storage portion 13 is designated as the circulation data is inputted on the operation display portion 11.

<Step S11>

First, in step S11, the control portion 16 detects other communication apparatuses 10 that exist within a predetermined range. Here, the processing in step S11 is executed by the apparatus detection portion 161 of the control portion 16.

For example, the control portion 16 controls the communication portion 12 to transmit a control signal according to the communication method of Bluetooth, to the surrounding area around the communication apparatus 10, thereby detecting apparatuses that can perform Bluetooth communication within the communication range of Bluetooth. Then, on the basis of the pairing IDs acquired from the detected apparatuses and the pairing IDs of other communication apparatuses 10 stored in the storage portion 13, the control portion 16 detects other communication apparatuses 10 from the detected apparatuses.

<Step S12>

In step S12, the control portion 16 generates the transmission destination list including all or some of the other communication apparatuses 10 detected in step S11. Here, the processing in step S12 is executed by the list generation portion 162 of the control portion 16.

For example, the control portion 16 generates the transmission destination list including, among the other communication apparatuses 10 detected in step S11, other communication apparatuses 10 that belong to the same group as the self-apparatus. For example, the control portion 16 acquires the group information from the other communication apparatuses 10 detected in step S11. Then, on the basis of the acquired group information, the control portion 16 generates the transmission destination list including the self-apparatus and the other communication apparatuses 10 that belong to the same group as the self-apparatus.

It is noted that, in the communication apparatus 10, if the transmission destination list generated in advance is stored in the storage portion 13, the processing in step S11 and step S12 may be omitted.

<Step S13>

In step S13, the control portion 16 acquires azimuths of the other communication apparatuses 10 detected in step S11. Here, the processing in step S13 is executed by the first azimuth acquisition portion 163 of the control portion 16.

For example, the control portion 16 acquires the position information of the self-apparatus on the basis of information included in radio waves transmitted from a plurality of GPS satellites and received by the GPS communication portion 14. In addition, the control portion 16 acquires, from the other communication apparatuses 10 detected in step S11, the position information of the other communication apparatuses 10. Then, the control portion 16 acquires azimuths of the other communication apparatuses 10 on the basis of the position information of the self-apparatus and the position information of the other communication apparatuses 10.

<Step S14>

In step S14, the control portion 16 detects the direction of the self-apparatus. Here, the processing in step S14 is executed by the second azimuth acquisition portion 164 of the control portion 16.

For example, the control portion 16 acquires the specific azimuth on the basis of terrestrial magnetism on each of the three axes detected by the terrestrial magnetism sensor 15 and the inclination of the communication apparatus 10 detected by the inclination sensor (not shown).

It is noted that, in the communication apparatus 10, if the azimuths of the other communication apparatuses 10 and information indicating the specific azimuth are stored in advance in the storage portion 13, the processing in step S13 and step S14 may be omitted. For example, in the case where the communication apparatuses 10 included in the communication system 100 are desktop-type apparatuses such as personal computers, the azimuths of the other communication apparatuses 10 and information indicating the specific azimuth may be stored in advance in the storage portion 13 of each communication apparatus 10.

<Step S15>

In step S15, the control portion 16 causes the display portion 111 to display a transmission operation screen on which the specific operation can be performed.

Figure 6:
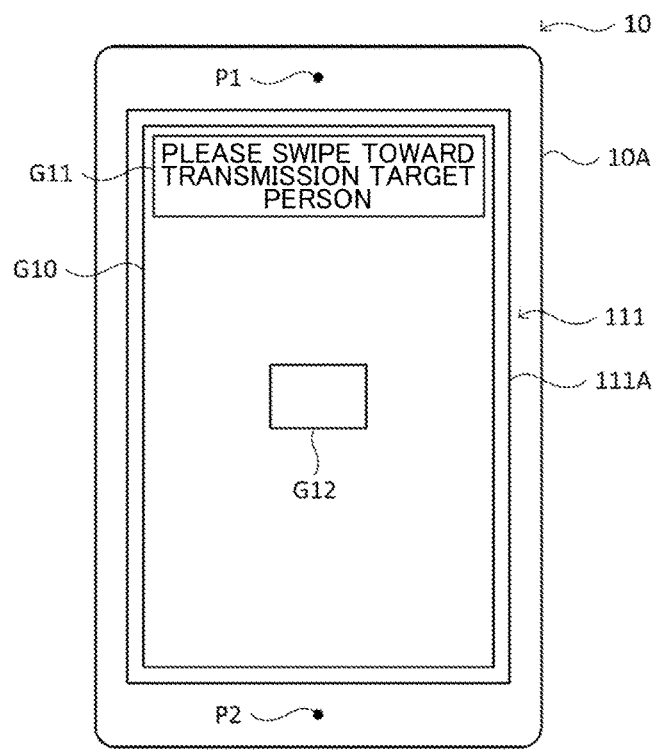
FIG. 6 is a view showing an example of a transmission operation screen displayed on the communication apparatus included in the communication system according to the embodiment of the present disclosure.

Here, FIG. 6 shows an example of the transmission operation screen displayed on the display portion 111 in step S15. A transmission operation screen G10 shown in FIG. 6 includes a message field G11 and an icon image G12. In the message field G11, a message to a user is displayed. The icon image G12 is an image indicating the circulation data.

Figure 7:
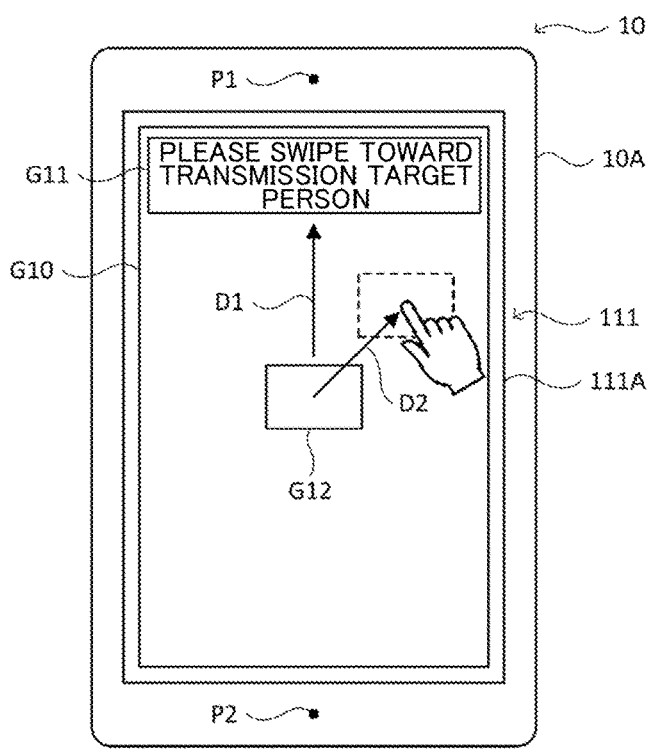
FIG. 7 is a view showing an example of a specific operation performed on the communication apparatus included in the communication system according to the embodiment of the present disclosure.

For example, on the transmission operation screen G10, if the specific operation is performed with the display area of the icon image G12 as a start point as shown in FIG. 7, the circulation data indicated by the icon image G12 is transmitted to another communication apparatus 10 that exists at an azimuth corresponding to a movement direction D2 of the specific operation. It is noted that, in FIG. 7, the icon image G12 moving on the transmission operation screen G10 in accordance with the specific operation is indicated by a broken line.

<Step S16>

In step S16, the control portion 16 determines whether or not the specific operation is performed on the transmission operation screen displayed in step S15. Specifically, the control portion 16 determines whether or not the specific operation is performed, on the basis of a result of detection about whether or not a user's finger contacts with the display surface 111A and detection of the contact position thereof by the operation detection portion 112.

Here, if the control portion 16 determines that the specific operation is performed on the transmission operation screen (Yes in S16), the control portion 16 shifts the process to step S17. On the other hand, if the specific operation is not performed on the transmission operation screen (No in S16), the control portion 16 waits for the specific operation in step S16.

<Step S17>

In step S17, the control portion 16 determines whether or not another communication apparatus 10 exists at an azimuth corresponding to the movement direction of the specific operation determined to be performed in step S16. Here, the processing in step S16 and step S17 is an example of a first step in the present disclosure, and is executed by the determination processing portion 165 of the control portion 16.

For example, the control portion 16 acquires an azimuth corresponding to the movement direction, on the basis of the specific azimuth acquired in step S14. For example, if the specific azimuth indicated by the specific direction D1 shown in FIG. 7 is north, the control portion 16 determines that the azimuth corresponding to the movement direction D2 is northeast. Then, on the basis of the azimuths of the other communication apparatuses 10 acquired in step S13, the control portion 16 determines whether or not another communication apparatus 10 exists at the acquired azimuth corresponding to the movement direction.

Here, if the control portion 16 determines that another communication apparatus 10 exists at the azimuth corresponding to the movement direction of the specific operation (Yes in S17), the control portion 16 shifts the process to step S18. On the other hand, if another communication apparatus 10 does not exist at the azimuth corresponding to the movement direction of the specific operation (No in S17), the control portion 16 shifts the process to step S16. In this case, the control portion 16 may cause the display portion 111 to display a message indicating that another communication apparatus 10 does not exist at the azimuth corresponding to the movement direction of the specific operation.

<Step S18>

In step S18, the control portion 16 determines whether or not the other communication apparatus 10 determined to exist at the azimuth corresponding to the movement direction in step S17 is included in the transmission destination list generated in step S12. Here, the processing in step S18 is executed by the transmission processing portion 166 of the control portion 16.

Here, if the control portion 16 determines that the other communication apparatus 10 determined to exist at the azimuth corresponding to the movement direction is included in the transmission destination list (Yes in S18), the control portion 16 shifts the process to step S19. On the other hand, if the other communication apparatus 10 determined to exist at the azimuth corresponding to the movement direction is not included in the transmission destination list (No in S18), the control portion 16 shifts the process to step S16. In this case, the control portion 16 may cause the display portion 111 to display a message indicating that the other communication apparatus 10 determined to exist at the azimuth corresponding to the movement direction is not included in the transmission destination list.

In the circulation list generation process, by execution of the processing in step S18, the circulation data and the transmission destination list are prevented from being erroneously transmitted to another communication apparatus 10 not included in the transmission destination list. It is noted that the processing in step S18 may be omitted.

<Step S19>

In step S19, the control portion 16 transmits the circulation data and the transmission destination list generated in step S12, to another communication apparatus 10 determined to exist at the azimuth corresponding to the movement direction in step S17. Here, the processing in step S19 is an example of a second step in the present disclosure, and is executed by the transmission processing portion 166 of the control portion 16.

[Circulation Data Transmission/Reception Process]

Figure 5:
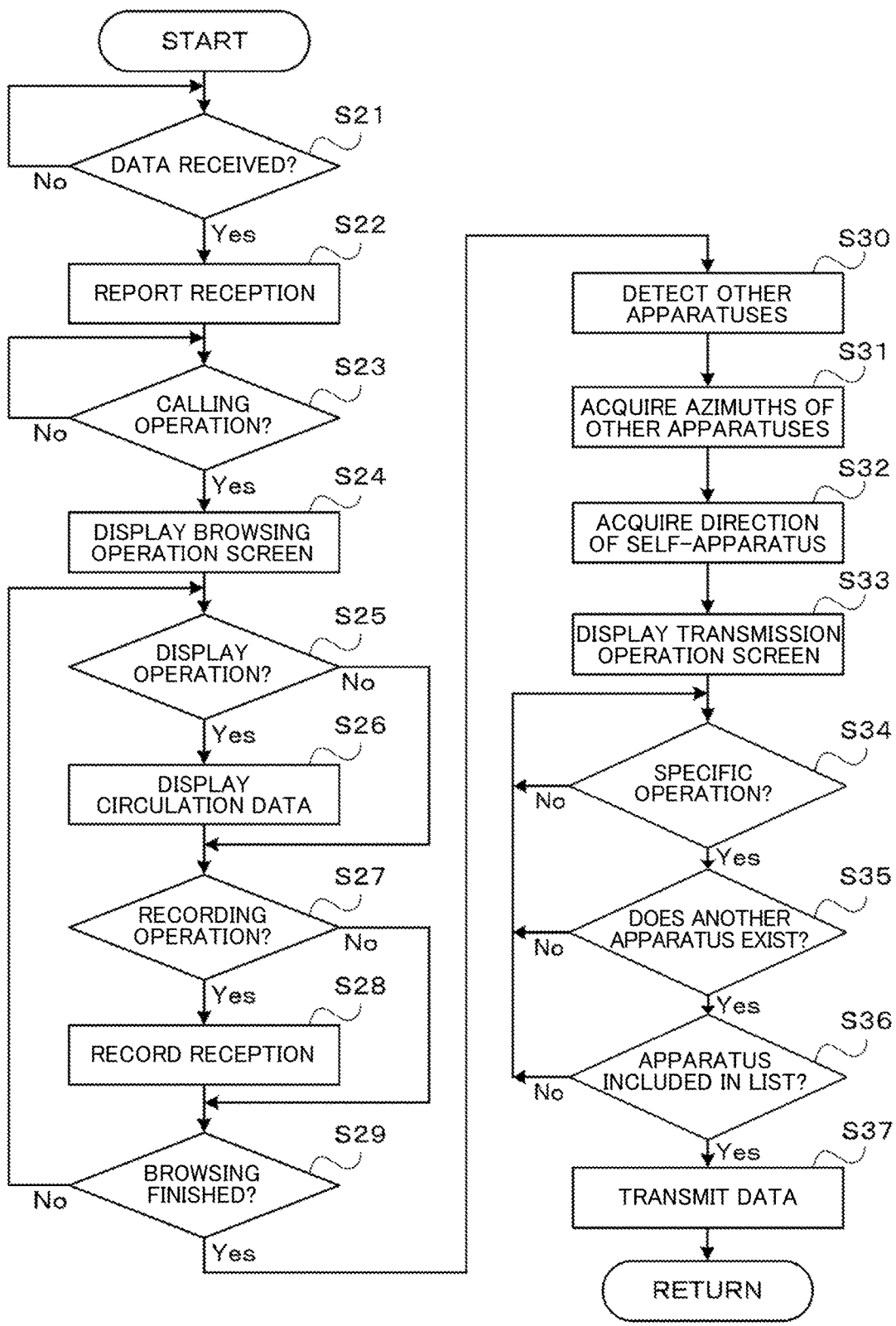
FIG. 5 is a flowchart showing an example of a circulation data transmission/reception process executed by the communication apparatus included in the communication system according to the embodiment of the present disclosure.

Hereinafter, with reference to FIG. 5, an example of the procedure of a communication method of the present disclosure will be described together with an example of the procedure of the circulation data transmission/reception process executed by the control portion 16 in the communication apparatus 10.

<Step S21>

First, in step S21, the control portion 16 determines whether or not the circulation data and the transmission destination list are received from another communication apparatus 10.

Here, if the control portion 16 determines that the circulation data and the transmission destination list are received from another communication apparatus 10 (Yes in S21), the control portion 16 shifts the process to step S22. On the other hand, if the circulation data and the transmission destination list are not received from another communication apparatus 10 (No in S21), the control portion 16 waits for reception of the circulation data and the transmission destination list from another communication apparatus 10 in step S21.

<Step S22>

In step S22, the control portion 16 reports reception of the circulation data and the transmission destination list from another communication apparatus 10. For example, the control portion 16 causes the display portion 111 to display a pop-up image including a message indicating that the circulation data and the transmission destination list are received from another communication apparatus 10.

<Step S23>

In step S23, the control portion 16 determines whether or not a calling operation is performed which is an operation for calling, onto the display portion 111, a browsing operation screen on which the circulation data determined to be received in step S21 can be browsed. For example, the calling operation is a touch operation on the pop-up image displayed on the display portion 111 in step S22.

Here, if the control portion 16 determines that the calling operation is performed (Yes in S23), the control portion 16 shifts the process to step S24. On the other hand, if the calling operation is not performed (No in S23), the control portion 16 waits for the calling operation to be performed in step S23.

<Step S24>

In step S24, the control portion 16 causes the display portion 111 to display the browsing operation screen.

Figure 8:
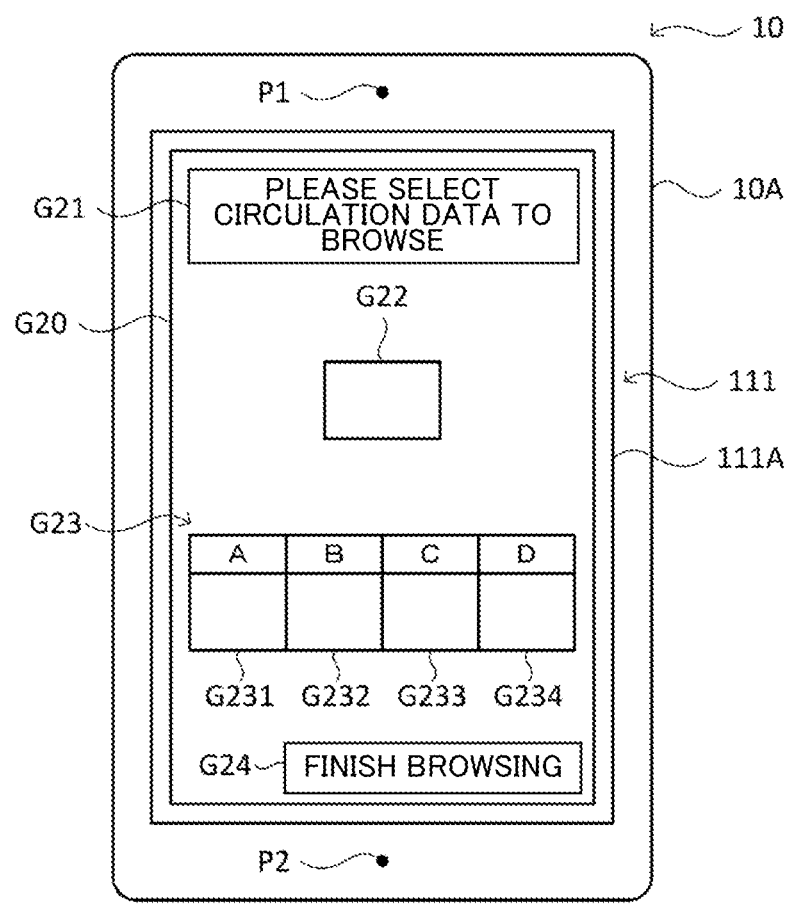
FIG. 8 is a view showing an example of a browsing operation screen displayed on the communication apparatus included in the communication system according to the embodiment of the present disclosure.

Here, FIG. 8 shows an example of the browsing operation screen displayed on the display portion 111 in step S24. A browsing operation screen G20 shown in FIG. 8 includes a message field G21, an icon image G22, a transmission destination list G23, and an operation key G24. In the message field G21, a message to a user is displayed. The icon image G22 is an image indicating the circulation data. In the transmission destination list G23, user identification information which enables identification of users corresponding to the respective communication apparatuses 10 included in the transmission destination list, is displayed, and reception record fields G231 to G234 provided for the respective users identified by the user identification information are displayed.

For example, on the browsing operation screen G20, if a touch operation is performed on the display area of the icon image G22, the content of the circulation data indicated by the icon image G22 is displayed on the display portion 111.

In addition, on the browsing operation screen G20, if a touch operation is performed on the display area of a reception record field corresponding to the self-apparatus among the reception record fields G231 to G234, reception of the circulation data by the self-apparatus is recorded in the transmission destination list G23. For example, reception information indicating reception of the circulation data by the self-apparatus is displayed on the reception record field corresponding to the self-apparatus.

In addition, on the browsing operation screen G20, if the operation key G24 is operated, the screen displayed on the display portion 111 is switched from the browsing operation screen G20 to the transmission operation screen G10.

<Step S25>

In step S25, the control portion 16 determines whether or not a display operation of requiring display of the content of the circulation data is performed on the browsing operation screen displayed in step S24. For example, the control portion 16 determines that the display operation is performed, when a touch operation is performed on the display area of the icon image G22 on the browsing operation screen G20.

Here, if the control portion 16 determines that the display operation is performed (Yes in S25), the control portion 16 shifts the process to step S26. On the other hand, if the display operation is not performed (No in S25), the control portion 16 shifts the process to step S27.

<Step S26>

In step S26, the control portion 16 causes the display portion 111 to display the content of the circulation data. Thus, the user of the communication apparatus 10 can confirm the content of the circulation data.

<Step S27>

In step S27, the control portion 16 determines whether or not the recording operation is performed on the browsing operation screen displayed in step S24. For example, the control portion 16 determines that the recording operation is performed, when a touch operation is performed on the display area of the reception record field corresponding to the self-apparatus among the reception record fields G231 to G234 on the browsing operation screen G20.

Here, if the control portion 16 determines that the recording operation is performed (Yes in S27), the control portion 16 shifts the process to step S28. On the other hand, if the recording operation is not performed (No in S27), the control portion 16 shifts the process to step S29.

<Step S28>

In step S28, the control portion 16 records, in the transmission destination list, reception of the circulation data by the self-apparatus. Here, the processing in step S27 and step S28 is executed by the recording processing portion 167 of the control portion 16.

For example, on the browsing operation screen G20, the control portion 16 records, in the transmission destination list G23, reception of the circulation data by the self-apparatus. Thus, the reception information indicating reception of the circulation data by the self-apparatus is displayed in the reception record field corresponding to the self-apparatus. Therefore, the users of the other communication apparatuses 10 can identify a user who has received the circulation data, by confirming the content of the transmission destination list.

<Step S29>

In step S29, the control portion 16 determines whether or not browsing of the circulation data on the browsing operation screen is finished. For example, the control portion 16 determines that browsing of the circulation data is finished, when the operation key G24 is operated on the browsing operation screen G20.

Here, if the control portion 16 determines that browsing of the circulation data is finished (Yes in S29), the control portion 16 shifts the process to step S30. On the other hand, if browsing of the circulation data is not finished (No in S29), the control portion 16 shifts the process to step S25.

<Step S30>

In step S30, the control portion 16 detects other communication apparatuses 10 that exist within a predetermined range, as in step S11 of the circulation list generation process. Here, the processing in step S30 is executed by the apparatus detection portion 161 of the control portion 16.

<Step S31>

In step S31, the control portion 16 acquires azimuths of the other communication apparatuses 10 detected in step S30, as in step S13 of the circulation list generation process. Here, the processing in step S31 is executed by the first azimuth acquisition portion 163 of the control portion 16.

<Step S32>

In step S32, the control portion 16 detects the direction of the self-apparatus, as in step S14 of the circulation list generation process. Here, the processing in step S32 is executed by the second azimuth acquisition portion 164 of the control portion 16.

<Step S33>

In step S33, the control portion 16 causes the display portion 111 to display the transmission operation screen, as in step S15 of the circulation list generation process.

<Step S34>

In step S34, the control portion 16 determines whether or not the specific operation is performed on the transmission operation screen displayed in step S33, as in step S16 of the circulation list generation process.

Here, if the control portion 16 determines that the specific operation is performed on the transmission operation screen (Yes in S34), the control portion 16 shifts the process to step S35. On the other hand, if the specific operation is not performed on the transmission operation screen (No in S34), the control portion 16 waits for the specific operation in step S34.

<Step S35>

In step S35, the control portion 16 determines whether or not another communication apparatus 10 exists at an azimuth corresponding to the movement direction of the specific operation determined to be performed in step S34, as in step S17 of the circulation list generation process. Here, the processing in step S34 and step S35 is an example of a first step in the present disclosure, and is executed by the determination processing portion 165 of the control portion 16.

Here, if the control portion 16 determines that another communication apparatus 10 exists at the azimuth corresponding to the movement direction of the specific operation (Yes in S35), the control portion 16 shifts the process to step S36. On the other hand, if another communication apparatus 10 does not exist at the azimuth corresponding to the movement direction of the specific operation (No in S35), the control portion 16 shifts the process to step S34. In this case, the control portion 16 may cause the display portion 111 to display a message indicating that another communication apparatus 10 does not exist at the azimuth corresponding to the movement direction of the specific operation.

<Step S36>

In step S36, the control portion 16 determines whether or not the other communication apparatus 10 determined to exist at the azimuth corresponding to the movement direction in step S35 is included in the transmission destination list received in step S21, as in step S18 of the circulation list generation process. Here, the processing in step S36 is executed by the transmission processing portion 166 of the control portion 16.

Here, if the control portion 16 determines that the other communication apparatus 10 determined to exist at the azimuth corresponding to the movement direction is included in the transmission destination list (Yes in S36), the control portion 16 shifts the process to step S37. On the other hand, if the other communication apparatus 10 determined to exist at the azimuth corresponding to the movement direction is not included in the transmission destination list (No in S36), the control portion 16 shifts the process to step S34. In this case, the control portion 16 may cause the display portion 111 to display a message indicating that the other communication apparatus 10 determined to exist at the azimuth corresponding to the movement direction is not included in the transmission destination list.

In the circulation data transmission/reception process, by execution of the processing in step S36, the circulation data and the transmission destination list are prevented from being erroneously transmitted to another communication apparatus 10 not included in the transmission destination list. It is noted that the processing in step S36 may be omitted.

<Step S37>

In step S37, the control portion 16 transmits the circulation data and the transmission destination list received in step S21 to the other communication apparatus 10 determined to exist at the azimuth corresponding to the movement direction in step S35, as in step S19 of the circulation list generation process. Here, the processing in step S37 is an example of a second step of the present disclosure, and is executed by the transmission processing portion 166 of the control portion 16.

As described above, in the circulation list generation process and the circulation data transmission/reception process, when the specific operation is detected on the transmission operation screen, it is determined whether or not another communication apparatus 10 exists at an azimuth corresponding to the movement direction of the operation position in the specific operation. Then, if another communication apparatus 10 is determined to exist at the azimuth corresponding to the movement direction, the circulation data and the transmission destination list are transmitted to the other communication apparatus 10 that exists at the azimuth corresponding to the movement direction. Thus, a user who intends to determine the next transmission destination of the circulation data voluntarily confirms the presence conditions of other users around the user, whereby the circulation data is prevented from being transmitted to the communication apparatus 10 corresponding to an absent user. Therefore, stagnation of circulation of the circulation data among a plurality of users can be avoided.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A communication system including a plurality of communication apparatuses, the communication apparatuses each comprising:
    a display portion;
    an operation detection portion configured to detect an operation on the display portion;
    a determination processing portion configured to, when a specific operation of moving an operation position on the display portion is detected by the operation detection portion, determine whether or not another one of the communication apparatuses exists at an azimuth corresponding to a movement direction of the operation position in the specific operation; and
    a transmission processing portion configured to, when the determination processing portion determines that another one of the communication apparatuses exists at the azimuth corresponding to the movement direction, transmit circulation data and a transmission destination list of the circulation data to the other communication apparatus that exists at the azimuth corresponding to the movement direction.

2. The communication system according to claim 1, the communication apparatuses each further comprising:
    an apparatus detection portion configured to detect the other communication apparatuses that exist within a predetermined range; and
    an azimuth acquisition portion configured to acquire azimuths of the other communication apparatuses detected by the apparatus detection portion, wherein
    the determination processing portion determines whether or not another one of the communication apparatuses exists at the azimuth corresponding to the movement direction, on the basis of the azimuths of the other communication apparatuses acquired by the azimuth acquisition portion.

3. The communication system according to claim 2, the communication apparatuses each further comprising a list generation portion configured to generate the transmission destination list including all or some of the other communication apparatuses detected by the apparatus detection portion.

4. The communication system according to claim 3, wherein
the list generation portion generates the transmission destination list including another communication apparatus that belongs to the same preset group as the self-apparatus among the other communication apparatuses detected by the apparatus detection portion.

5. The communication system according to claim 1, wherein
the transmission processing portion transmits the circulation data and the transmission destination list when the other communication apparatus that exists at the azimuth corresponding to the movement direction is included in the transmission destination list.

6. The communication system according to claim 1, the communication apparatuses each further comprising a recording processing portion configured to, when a predetermined recording condition is satisfied, record reception of the circulation data by the self-apparatus in the transmission destination list.

7. A communication apparatus comprising:
a display portion;
an operation detection portion configured to detect an operation on the display portion;
a determination processing portion configured to, when a specific operation of moving an operation position on the display portion is detected by the operation detection portion, determine whether or not another one of the communication apparatuses exists at an azimuth corresponding to a movement direction of the operation position in the specific operation; and
a transmission processing portion configured to, when the determination processing portion determines that another one of the communication apparatuses exists at the azimuth corresponding to the movement direction, transmit circulation data and a transmission destination list of the circulation data to the other communication apparatus that exists at the azimuth corresponding to the movement direction.

8. A communication method to be executed by a communication system including a plurality of communication apparatuses each including a display portion and an operation detection portion configured to detect an operation on the display portion, the communication method comprising:
a first step of, when a specific operation of moving an operation position on the display portion is detected by the operation detection portion, determining whether or not the communication apparatus exists at an azimuth corresponding to a movement direction of the operation position in the specific operation; and
a second step of, when it is determined in the first step that the communication apparatus exists at the azimuth corresponding to the movement direction, transmitting circulation data and a transmission destination list of the circulation data to the communication apparatus that exists at the azimuth corresponding to the movement direction.

* * * * *